US012381484B2

(12) United States Patent
Jin

(10) Patent No.: US 12,381,484 B2
(45) Date of Patent: Aug. 5, 2025

(54) VOLTAGE REGULATING APPARATUS, CHIP, POWER SUPPLY AND ELECTRONIC DEVICE

(71) Applicant: Chipone Technology (Beijing) Co., LTD., Beijing (CN)

(72) Inventor: Ning Jin, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 355 days.

(21) Appl. No.: 17/989,419

(22) Filed: Nov. 17, 2022

(65) Prior Publication Data

US 2023/0163686 A1 May 25, 2023

Related U.S. Application Data

(63) Continuation of application No. PCT/CN2021/091044, filed on Apr. 29, 2021.

(30) Foreign Application Priority Data

May 29, 2020 (CN) .......................... 202010477007.8

(51) Int. Cl.
*H02M 3/158* (2006.01)
*H02M 1/00* (2006.01)
(52) U.S. Cl.
CPC ......... *H02M 3/158* (2013.01); *H02M 1/0009* (2021.05); *H02M 1/0022* (2021.05)
(58) Field of Classification Search
None
See application file for complete search history.

(56) References Cited

U.S. PATENT DOCUMENTS 8,094,472 B2 * 1/2012 Chang ................. H02M 1/4225
363/80
9,450,492 B1 9/2016 Bizjak et al.
(Continued)

FOREIGN PATENT DOCUMENTS

CN 101661301 3/2010
CN 102023668 4/2011
(Continued)

OTHER PUBLICATIONS

Extended European Search Report in European Appln No. 21811850.3, dated Sep. 1, 2023, 8 pages.
(Continued)

*Primary Examiner* — Peter M Novak
(74) *Attorney, Agent, or Firm* — Fish & Richardson P.C.

(57) ABSTRACT

This application describes example voltage regulating apparatuses, chips, power supplies, and electronic devices. In one example, an apparatus includes: a voltage input interface (10), which is used to receive an input voltage; a current determination component (20), which is electrically connected to the voltage input interface (10) and is used for determining a regulating current according to the input voltage and the amount of change between the input voltage and an adjacent input voltage of a previous moment; a controller (30), which is electrically connected to the current determination component (20) and is used to output a control signal according to the regulating current; and a voltage output interface (40), which is electrically connected to the voltage input interface (10), the current determination component (20) and the controller (30) and is used to output a target voltage according to the control signal and the input voltage.

16 Claims, 5 Drawing Sheets

(56) References Cited

U.S. PATENT DOCUMENTS

| | | | |
|---|---|---|---|
| 2010/0270995 A1 | 10/2010 | Laur et al. | |
| 2012/0087053 A1 | 4/2012 | Mizui | |
| 2014/0369097 A1 | 12/2014 | Prescott et al. | |
| 2018/0262107 A1 | 9/2018 | Raval et al. | |
| 2019/0074764 A1 | 3/2019 | Hu et al. | |
| 2020/0313545 A1* | 10/2020 | Takegami | G01R 31/016 |

FOREIGN PATENT DOCUMENTS

| | | |
|---|---|---|
| CN | 106787626 | 5/2017 |
| CN | 110518799 | 11/2019 |
| CN | 111596715 | 8/2020 |
| CN | 111596716 | 8/2020 |
| CN | 211857324 | 11/2020 |
| CN | 212433648 | 1/2021 |
| JP | 01110057 | 4/1989 |
| JP | 10323028 | 12/1998 |
| JP | 11168874 | 6/1999 |
| JP | 2014207741 | 10/2014 |
| KR | 19980050376 | 9/1998 |

OTHER PUBLICATIONS

International Search Report in International Appln. No. PCT/CN2021/091044, dated Jun. 29, 2021, 3 pages (with English translation).
Office Action in Japanese Appln. No. 2022-569590, dated Nov. 21, 2023, 7 pages (with English translation).
Office Action in Korean Appln. No. 10-2022-7016047, dated Jan. 5, 2024, 10 pages (with English translation).
EP Communication Pursuant to Article 94(3) EPC in European Appln. No. 21811850.3, mailed on Nov. 12, 2024, 6 pages.

* cited by examiner

US 12,381,484 B2

VOLTAGE REGULATING APPARATUS, CHIP, POWER SUPPLY AND ELECTRONIC DEVICE

CROSS-REFERENCE TO RELATED APPLICATION

The present disclosure is a continuation and claims priority under 35 U.S.C. § 120 to PCT Application No. PCT/CN2021/091044, filed on Apr. 29, 2021, which claims the priority to Chinese Patent Application No. 202010477007.8 filed with China National Intellectual Property Administration, PRC, on May 29, 2020, entitled "Voltage Regulating Apparatus, Chip, Power Supply and Electronic Device." All the above referenced priority documents are incorporated herein by reference in their entireties.

TECHNICAL FIELD

The present disclosure relates to the field of integrated circuits, and in particular, to a voltage adjustment apparatus, a chip, a power source and an electronic device.

BACKGROUND

In the power drive management chip of AMOLED (Active-matrix organic light-emitting diode), there is such a TDMA (Time division multiple access) test requirement: the input power source will be disturbed at intervals, that is, jumping up or down by 500 mV within 10 µs, and the 500 mV jump will last for at least 500 µs. If such disturbance occurs, there must be overshoot or undershoot for the output of the Boost architecture of DC-DC, and such disturbance is required to be less than 20 mV for a load within 200 mA, and less than 60 mV for a load within 1 A.

However, when the input power source is disturbed, the related art cannot quickly track change, which often leads to disturbances such as overshoot and undershoot of the output voltage, resulting in unstable output voltage.

SUMMARY

In view of this, the present disclosure proposes a voltage adjustment apparatus, comprising:
- a voltage input module, configured to receive an input voltage;
- a current determination module, electrically connected to the voltage input module, and configured to determine an adjustment current based on the input voltage and a change amount between the input voltage and an input voltage at an adjacent previous moment;
- a control module, electrically connected to the current determination module, and configured to output a control signal based on the adjustment current; and
- a voltage output module, electrically connected to the voltage input module, the current determination module and the control module, and configured to output a target voltage based on the control signal and the input voltage.

In a possible embodiment, the adjustment current comprises a first adjustment current, and the current determination module comprises a first determination unit configured to determine the first adjustment current,
the first determination unit comprises a first operational amplifier, a first transistor, a second transistor, a third transistor, a fourth transistor, a fifth transistor and a first resistor, wherein,
a positive input terminal of the first operational amplifier is configured to receive the input voltage, a negative input terminal of the first operational amplifier is electrically connected to a source of the first transistor and a first terminal of the first resistor, an output terminal of the first operational amplifier is electrically connected to a gate of the first transistor, and a second terminal of the first resistor is grounded,
a drain of the first transistor is electrically connected to a drain of the second transistor, a gate of the second transistor and a gate of the third transistor,
a source of the second transistor and a source of the third transistor are configured to receive a power source voltage,
a drain of the third transistor is electrically connected to a drain of the fourth transistor, a gate of the fourth transistor and a gate of the fifth transistor,
a source of the fourth transistor and a source of the fifth transistor are grounded, and
a drain of the fifth transistor is configured to output the first adjustment current.

In a possible embodiment, the adjustment current comprises a second adjustment current, the current determination module comprises a second determination unit configured to determine the second adjustment current, and the second determination unit comprises a current detection subunit, a multiplication subunit and a current determination subunit, wherein,
the current detection subunit is electrically connected to the voltage output module, and configured to detect a load current and obtain a detection voltage based on the load current;
the multiplication subunit is electrically connected to the current detection subunit and the voltage input module, and configured to multiply the input voltage and the detection voltage to obtain an intermediate voltage; and
the current determination subunit is electrically connected to the multiplication subunit, and configured to determine the second adjustment current based on the intermediate voltage.

In a possible embodiment, the current detection subunit comprises a sixth transistor, a seventh transistor, a second operational amplifier, a second resistor and a first capacitor, wherein,
a gate of the sixth transistor is configured to receive the control signal, a drain of the sixth transistor is electrically connected to the voltage input module, and a source of the sixth transistor is electrically connected to a positive input terminal of the second operational amplifier and a drain of the seventh transistor,
a negative input terminal of the second operational amplifier is electrically connected to the voltage output module, an output terminal of the second operational amplifier is electrically connected to a gate of the seventh transistor, and a source of the seventh transistor is electrically connected to a first terminal of the second resistor and a first terminal of the first capacitor,
a second terminal of the second resistor and a second terminal of the first capacitor are grounded, and
the first terminal of the second resistor is configured to output the detection voltage.

In a possible embodiment, the voltage output module comprises an eighth transistor, a ninth transistor, a tenth transistor, an eleventh transistor, a third operational amplifier, a third resistor, a fourth resistor and a second capacitor, wherein, a gate of the eighth transistor is electrically connected to the gate of the sixth transistor, a gate of the tenth transistor and the control module, and configured to receive the control signal, a drain of the eighth transistor is electrically connected to a drain of the ninth transistor, the drain of the sixth transistor, a drain of the tenth transistor and the voltage input module, a source of the eighth transistor is electrically connected to a negative input terminal of the third operational amplifier, the negative input terminal of the second operational amplifier, a first terminal of the third resistor and a first terminal of the second capacitor, a second terminal of the third resistor is electrically connected to the control module and a first terminal of the fourth resistor, a second terminal of the fourth resistor is grounded, and a second terminal of the second capacitor is grounded, a gate of the ninth transistor is electrically connected to the control module and configured to receive the control signal, and a source of the ninth transistor is grounded, a positive input terminal of the third operational amplifier is electrically connected to a source of the tenth transistor and a drain of the eleventh transistor, and an output terminal of the third operational amplifier is electrically connected a gate of the eleventh transistor, a source of the eleventh transistor is electrically connected to the current determination module and the control module, and the first terminal of the third resistor is configured to output the target voltage.

In a possible embodiment, the voltage input module comprises an input capacitor and an input inductor, wherein, a first terminal of the input capacitor is electrically connected to a first terminal of the input inductor and configured to receive the input voltage, and a second terminal of the input capacitor is grounded, and a second terminal of the input inductor is electrically connected to the drain of the ninth transistor, the drain of the eighth transistor, the drain of the sixth transistor, and the drain of the tenth transistor.

According to an aspect of the present disclosure, there is provided a chip comprising the voltage adjustment apparatus.

According to an aspect of the present disclosure, there is provided a power source comprising the chip.

According to an aspect of the present disclosure, there is provided an electronic device comprising the power source.

In a possible embodiment, the electronic device comprises a display, a smartphone or a portable device.

Through the above apparatus, in the embodiment of the present disclosure, the current determination module determines the adjustment current based on the input voltage and a change amount between the input voltage and an input voltage at an adjacent previous moment. As long as the input voltage changes, the current determination module can respond quickly, and output the adjustment current to the control module to generate the control signal. The voltage output module can output a stable target voltage based on the control signal, without excessive overshoot and undershoot. The voltage adjustment apparatus proposed according to the present disclosure can output a stable target voltage, can respond quickly to change of the input voltage, and has the characteristics of being reliable and stable.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate exemplary embodiments, features, and aspects of the present disclosure, together with the description, and serve to explain the principles of the present disclosure.

DETAILED DESCRIPTION

Figure 1:
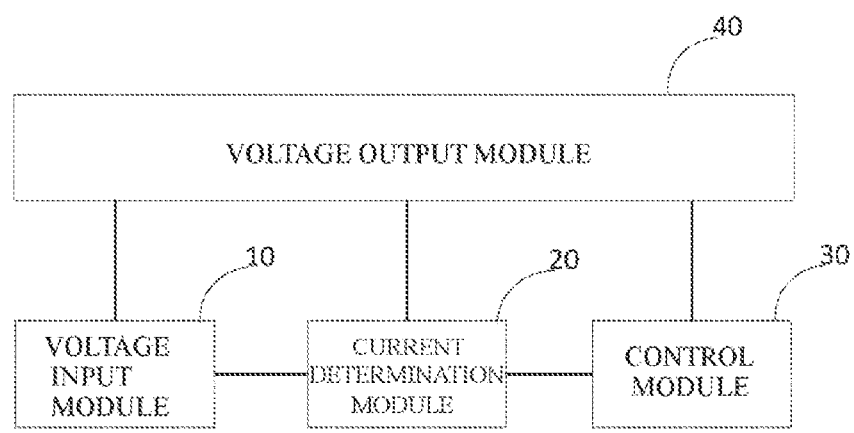
FIG. 1 shows a schematic diagram of a voltage adjustment apparatus according to an embodiment of the present disclosure.

Various exemplary embodiments, features and aspects of the present disclosure will be described in detail below with reference to the accompanying drawings. The same reference numerals in the drawings denote elements with the same or similar functions. While various aspects of the embodiments are shown in the drawings, the drawings are not necessary to be drawn to scale unless otherwise indicated.

The word "exemplary" used exclusively herein means "used as an example, embodiment, or illustrative." Any embodiment described herein as "exemplary" is not necessary to be construed as superior to or better than other embodiments.

In addition, in order to better illustrate the present disclosure, numerous specific details are given in the following detailed description. It should be understood by those skilled in the art that the present disclosure may be practiced without certain specific details. In some instances, methods, means, elements and circuits well known to those skilled in the art will not be described in detail so as to highlight the gist of the present disclosure.

Please refer to FIG. 1, which shows a schematic diagram of a voltage adjustment apparatus according to an embodiment of the present disclosure.

As shown in FIG. 1, the apparatus includes:

a voltage input module 10, configured to receive an input voltage;

a current determination module 20, electrically connected to the voltage input module 10, and configured to determine an adjustment current based on the input voltage and a change amount between the input voltage and an input voltage at an adjacent previous moment;

a control module 30, electrically connected to the current determination module 20, and configured to output a control signal based on the adjustment current; and a voltage output module 40, electrically connected to the voltage input module 10, the current determination module 20 and the control module 30, and configured to output a target voltage based on the control signal and the input voltage.

Through the above apparatus, in the embodiment of the present disclosure, the current determination module determines the adjustment current based on the input voltage and the change amount between the input voltage and an input voltage at an adjacent previous moment. As long as the input voltage changes, the current determination module can respond quickly, and output the adjustment current to the control module to generate the control signal. The voltage output module can output a stable target voltage based on the control signal, without excessive overshoot and undershoot. The voltage adjustment apparatus proposed according to the present disclosure can output a stable target voltage, can respond quickly to change of the input voltage, and has the characteristics of being reliable and stable.

The voltage adjustment apparatus proposed in the present disclosure may include a DC-DC conversion circuit (direct current-direct current conversion circuit), and can output a stable and reliable target voltage according to the input DC voltage.

Figure 2:
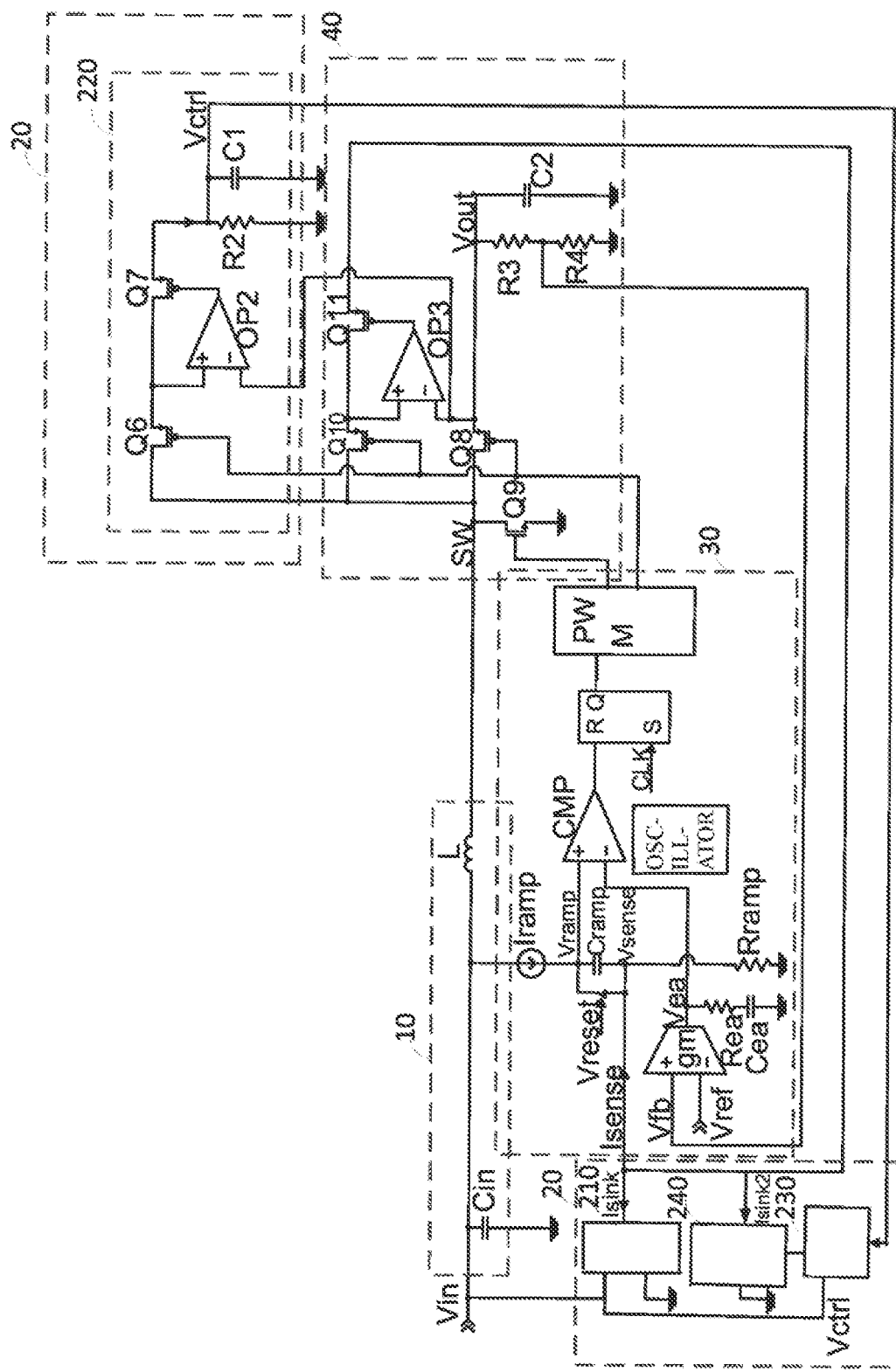
FIG. 2 shows a schematic diagram of a voltage adjustment apparatus according to an embodiment of the present disclosure.

Please refer to FIG. 2, which shows a schematic diagram of a voltage adjustment apparatus according to an embodiment of the present disclosure.

In a possible embodiment, as shown in FIG. 2, the adjustment current may include a first adjustment current Isink1, and the current determination module 20 may include a first determination unit 210 for determining the first adjustment current.

Figure 3:
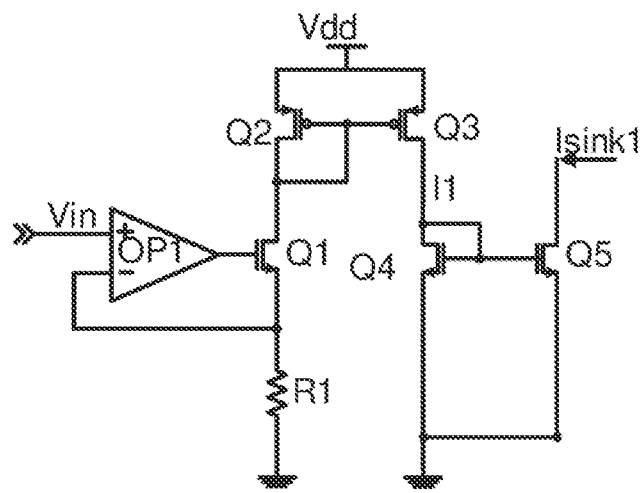
FIG. 3 shows a schematic diagram of a first determination unit according to an embodiment of the present disclosure.

Please also refer to FIG. 3, which shows a schematic diagram of the first determination unit according to an embodiment of the present disclosure.

In a possible embodiment, as shown in FIG. 3, the first determination unit may include a first operational amplifier OP1, a first transistor Q1, a second transistor Q2, a third transistor Q3, a fourth transistor Q4, a fifth transistor Q5 and a first resistor R1, wherein, a positive input terminal of the first operational amplifier OP1 is used to receive the input voltage Vin, a negative input terminal of the first operational amplifier OP1 is electrically connected to a source of the first transistor Q1 and a first terminal of the first resistor, an output terminal of the first operational amplifier OP1 is electrically connected to a gate of the first transistor Q1, and a second terminal of the first resistor R1 is grounded, a drain of the first transistor Q1 is electrically connected to a drain of the second transistor Q2, a gate of the second transistor Q2 and a gate of the third transistor Q3, a source of the second transistor Q2 and a source of the third transistor Q3 are used to receive a power source voltage Vdd, a drain of the third transistor Q3 is electrically connected to a drain of the fourth transistor Q4, a gate of the fourth transistor Q4 and a gate of the fifth transistor Q5, a source of the fourth transistor Q4 and a source of the fifth transistor Q5 are grounded, a drain of the fifth transistor Q5 is used to output the first adjustment current Isink1.

Through the above apparatus, in the embodiment of the present disclosure, the first determination unit determines the first adjustment current Isink1 in response to the change of the input voltage, so as to compensate for the change of the input voltage and generate a control signal, so that the output voltage is stable, and the fluctuation of the output voltage is reduced when the input voltage changes.

In one example, when Vin changes by a variation of $\Delta$Vin and is input to the first determination unit, the first determination unit may determine the change of the first adjustment current Isink1 as $\Delta$Isink1=gm1*$\Delta$Vin, where gm1 represents a predetermined adjustment parameter, Vin represents the input voltage, and "*" represents a multiplication operation.

In this way, when the first adjustment current is input to the control module, the control module can use the first adjustment current to compensate for the change of the input voltage and generate the control signal to adaptively adjust the size of the output voltage, so that the change fluctuation of the output voltage is small.

It should be noted that the embodiment of the present disclosure does not limit the specific size of gm1, which can be determined by those skilled in the art by means of simulation as required.

Please continue to refer to FIG. 2. In a possible embodiment, as shown in FIG. 2, the adjustment current may further include a second adjustment current Isink2, and the current determination module 20 may further include a second determination unit for determining the second adjustment current, and the second determination unit may include a current detection subunit 220, a multiplication subunit 230 and a current determination subunit 240, wherein, the current detection subunit 220 is electrically connected to the voltage output module, and configured to detect a load current and obtain a detection voltage Vctrl based on the load current;

the multiplication subunit 230 is electrically connected to the current detection subunit and the voltage input module, and configured to multiply the input voltage Vin and the detection voltage Vctrl to obtain an intermediate voltage; and the current determination subunit 240 is electrically connected to the multiplication subunit 230, and configured to determine the second adjustment current Isink2 based on the intermediate voltage.

Through the above apparatus, the embodiment of the present disclosure can control the control signal in response to the change of the input voltage, so that the output voltage is stable, and can control the control signal by combining the input voltage and the detection voltage obtained by the current detection subunit detecting the load current, so that the stable output of voltage under different load conditions can be achieved.

In a possible embodiment, as shown in FIG. 2, the current detection subunit 220 may include a sixth transistor Q6, a seventh transistor Q7, a second operational amplifier OP2, a second resistor R2 and a first capacitor C1, wherein, a gate of the sixth transistor Q6 is used to receive the control signal, a drain of the sixth transistor Q6 is electrically connected to the voltage input module, and a source of the sixth transistor Q6 is electrically connected to a positive input terminal of the second operational amplifier OP2 and a drain of the seventh transistor Q7, a negative input terminal of the second operational amplifier OP2 is electrically connected to the voltage output module, an output terminal of the second operational amplifier OP2 is electrically connected to a gate of the seventh transistor Q7, and a source of the seventh transistor Q7 is electrically connected to a first terminal of the second resistor R2 and a first terminal of the first capacitor C1, a second terminal of the second resistor R2 and a second terminal of the first capacitor C1 are grounded, the first terminal of the second resistor R2 is used to output the detection voltage Vctrl.

Through the above apparatus, in the embodiment of the present disclosure, the current detection subunit can realize the detection of the load current, determine the detection voltage based on the detected load current, and determine a second adjustment current based on the detection voltage, so that the change of the load terminal can be compensated for to realize the control of the control signal based on different load conditions.

In one example, in the detection, the current detection subunit may average the current of the eighth transistor by $(1-D)T*IL$, so as to obtain the detection voltage $Vtrcl=(1-D)T*IL*R$, where D represents a duty cycle, T represents a clock period, IL represents an inductance of an input inductor L, and R represents the resistance value of the second resistor R2.

The current detection subunit may convert the value of the load current into the detection voltage $Vctrl=\alpha*Id$, where $\alpha$ represents a preset parameter, and Id represents the load current.

In one example, the multiplication subunit may include an analog multiplier (Analog Multiple). The embodiments of the present disclosure do not limit the implementation of the multiplier. Those skilled in the art may implement the multiplier through a dedicated hardware circuit or use an existing analog multiplier as needed.

The intermediate voltage output by the multiplication subunit is $Vmul=\beta*Vctrl*Vin=\alpha*\beta*Id*Vin$, where $\beta$ represents a preset multiplication parameter.

In one example, the second adjustment current output by the current determination subunit 240 is $Isink2=gm2*Vmul=gm2*\alpha*\beta*Id*Vin$, where gm2 is a preset parameter of the current determination subunit.

In one example, the change of the adjustment current output by the current determination module 20 can be expressed as $\Delta Isink=\Delta Isink1+\Delta Isink2=gm1*\Delta Vin+gm2*\alpha*\beta*Id*\Delta Vin=(gm1+gm2*\alpha*\beta*Id)*\Delta Vin$.

Wherein for the implementation of the current determination subunit 240, please refer to the implementation of the first determination unit 210, which will not be repeated herein.

Through the above apparatus, the embodiment of the present disclosure can realize fast response to the input voltage, and can provide compensation for different loads. Therefore, the apparatus can adapt to various loads and increase environmental adaptability.

In a possible embodiment, as shown in FIG. 2, the voltage output module 40 may include an eighth transistor Q8, a ninth transistor Q9, a tenth transistor Q10, an eleventh transistor Q11, a third operational amplifier OP3, a third resistor R3, a fourth resistor R4 and a second capacitor C2, wherein, a gate of the eighth transistor Q8 is electrically connected to the gate of the sixth transistor Q6, a gate of the tenth transistor Q10 and the control module, and used to receive the control signal, a drain of the eighth transistor Q8 is electrically connected to a drain of the ninth transistor Q9, the drain of the sixth transistor Q6, a drain of the tenth transistor Q10 and the voltage input module, a source of the eighth transistor Q8 is electrically connected to a negative input terminal of the third operational amplifier OP3, the negative input terminal of the second operational amplifier OP2, a first terminal of the third resistor R3 and a first terminal of the second capacitor C2, a second terminal of the third resistor R3 is electrically connected to the control module and a first terminal of the fourth resistor R4, a second terminal of the fourth resistor R4 is grounded, and a second terminal of the second capacitor C2 is grounded, a gate of the ninth transistor Q9 is electrically connected to the control module and used to receive the control signal, and a source of the ninth transistor Q9 is grounded, a positive input terminal of the third operational amplifier OP3 is electrically connected to a source of the tenth transistor Q10 and a drain of the eleventh transistor Q11, and an output terminal of the third operational amplifier OP3 is electrically connected a gate of the eleventh transistor Q11, a source of the eleventh transistor Q11 is electrically connected to the current determination module and the control module, and the first terminal of the third resistor R3 is used to output the target voltage.

Through the above apparatus, the voltage output module of the embodiment of the present disclosure can realize the voltage output based on the control signal and the input voltage introduced from the input module, so as to output a stable target voltage.

In a possible embodiment, the target voltage can be obtained according to the following formula:

$$Vout=Vin/(1-D), \text{ where } D \text{ may represent the duty cycle of the control signal.}$$

Therefore, by adjusting the duty cycle of the control signal, the present disclosure can quickly respond to the change of the input voltage and output the required target output voltage.

Possible implementations of the voltage input module 10 will be introduced below. It should be understood that the following description is exemplary and should not be regarded as a limitation of the present disclosure.

In a possible embodiment, as shown in FIG. 2, the voltage input module 10 may include an input capacitor Cin and an input inductor L, wherein, a first terminal of the input capacitor Cin is electrically connected to a first terminal of the input inductor L and used to receive the input voltage, and a second terminal of the input capacitor Cin is grounded, a second terminal of the input inductor L is electrically connected to the drain of the ninth transistor Q9, the drain of the eighth transistor Q8, the drain of the sixth transistor Q6, and the drain of the tenth transistor Q10.

It should be noted that although the present disclosure describes the input capacitor as an example, it should be understood that the present disclosure is not limited to this. In other embodiments, the input capacitor may be replaced with an input capacitor network composed of a plurality of capacitors, the input capacitor network may include a plurality of capacitors, and the present disclosure does not limit the connection relationship and the number of the capacitors.

In a possible embodiment, the input inductor L may be set as or replaced with a plurality of inductors, and the connection manner of the plurality of inductors may be in series, parallel, or a combination thereof. The present disclosure does not limit the number and the connection relationship of inductors included in the inductor L.

Possible implementations of the control module 30 will be introduced below. It should be understood that the following description is exemplary and should not be regarded as a limitation of the present disclosure.

In a possible embodiment, as shown in FIG. 2, the control module 30 may include an error amplifier gm, a reference resistor Rea, a reference capacitor Cea, a comparator CMP, an oscillator, a flip-flop, a pulse width modulation PWM controller (PWM Control Driver), a current source Iramp, a reset switch Vreset, a capacitor Cramp and a sampling resistor Rramp, wherein:

- a positive terminal of the error amplifier gm is electrically connected between the third resistor and the fourth resistor and used to input a feedback voltage signal Vfb of the voltage output module 40, a negative terminal of the error amplifier gm is used to input a reference voltage Vref, and an output terminal of the error amplifier gm is electrically connected to a first terminal of the reference resistor Rea and a negative terminal of the comparator CMP;
- a second terminal of the reference resistor Rea is electrically connected to a first terminal of the reference capacitor Cea, and a second terminal of the reference capacitor Cea is grounded;
- a positive terminal of the comparator CMP is electrically connected to the current source Iramp, a first terminal of the capacitor Cramp, and a first terminal of the reset switch and used to input a comparison voltage Vramp, and an output terminal of the comparator CMP is electrically connected to a first terminal R of the flip-flop;
- an output terminal of the current determination module is electrically connected to a second terminal of the reset switch, a second terminal of the capacitor Cramp and a first terminal of the sampling resistor Rramp, and outputs the first adjustment current Isink1 and/or the second adjustment current Isink2, and a second terminal of the sampling resistor Rramp is grounded;
- a second terminal S of the flip-flop is electrically connected to an output terminal of the oscillator and used to receive a clock signal CLK output by the oscillator, and an output terminal Q of the flip-flop is electrically connected to an input terminal of the PWM controller;
- a first output terminal of the PWM controller is electrically connected to the gate of the ninth transistor, and a second output terminal of the PWM controller is electrically connected to the gate of the eighth transistor, the gate of the tenth transistor, and the gate of the sixth transistor.

In a possible embodiment, the flip-flop may be configured so that:

when a high level (1) is input to the first terminal R, the output terminal Q outputs 1;

when the high level is input to the second terminal S, the output terminal Q outputs 0.

In a possible embodiment, the PWM controller may be configured so that:

when 1 is input to the input terminal, the output is 1;

when 0 is input to the input terminal, the output is 0.

In the embodiment of the present disclosure, a current determination module may include the first determination unit and/or the second determination unit.

When the current determination module includes the first determination unit, in a possible embodiment, in a case where the input voltage increases, for example, when Vin changes by a variation of $\Delta$Vin and is input to the first determination unit, the first determination unit may determines the change of the first adjustment current Isink1 as $\Delta$Isink1=gm1*$\Delta$Vin. In this way, the initial level of Vramp changes by a component of gm1*$\Delta$Vin*Rramp, and this change is used to ensure that the output of Vea does not change as much as possible, which means that the variation of Vfb is small in a case where Vref remains unchanged, that is, the change of $\Delta$Vout is small, thereby reducing the fluctuation of the output voltage. In this way, the voltage output module 40 can output a stable target voltage.

Figure 4:
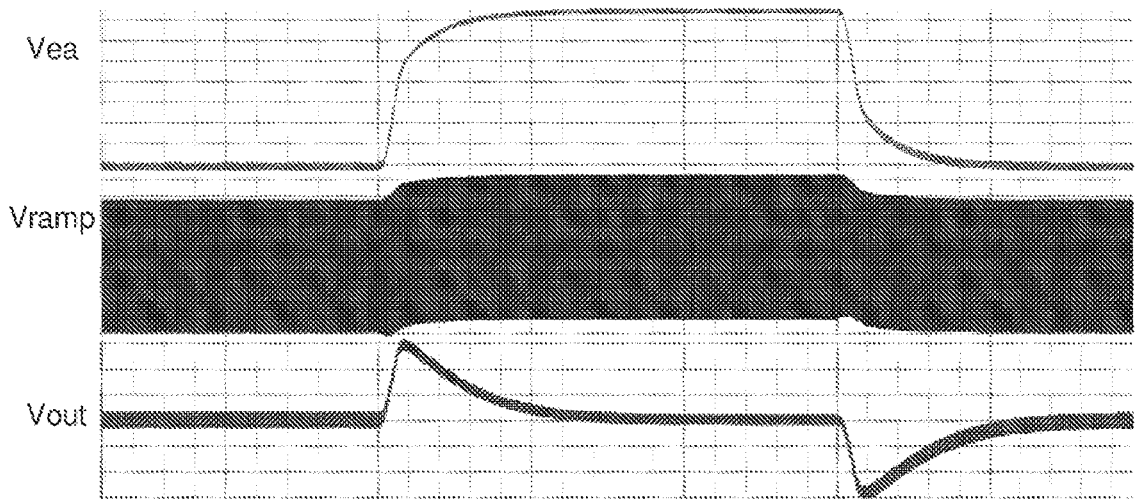
FIG. 4 shows a schematic diagram of voltage change in the DC-DC architecture of the related art.

Please refer to FIG. 4, which shows a schematic diagram of voltage change in the DC-DC architecture of the related art.

Figure 5:
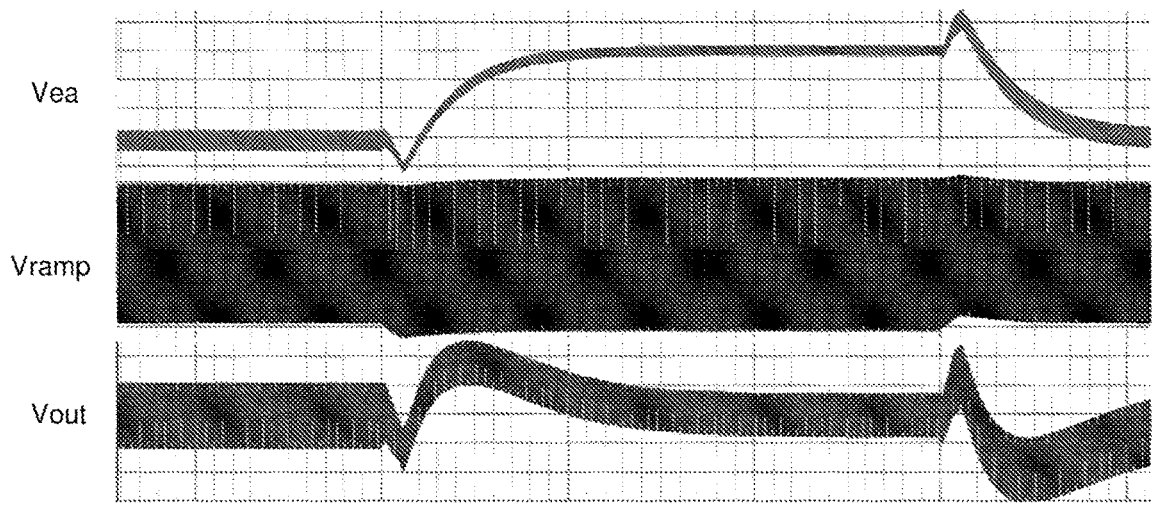
FIG. 5 shows a schematic diagram of voltage change in a voltage adjustment apparatus according to an embodiment of the present disclosure.

Please refer to FIG. 5, which shows a schematic diagram of voltage change in a voltage adjustment apparatus according to an embodiment of the present disclosure.

As shown in FIG. 4, in the related art, when the input voltage Vin changes, the change of the output voltage Vout acts on the error amplifier gm, which will affect Vea. As Vea changes more, the slower the new duty cycle D is adjusted through the loop. Therefore, the output voltage that the output jumps up or down with the input voltage will be very large. In this case, the peak-to-peak value of the output voltage Vout can reach 130 mV.

As shown in FIG. 5, the first determination unit in the embodiment of the present disclosure determines the first adjustment current to control the control module, so that the fluctuation of the output voltage can be greatly reduced, and the peak-to-peak value of the output voltage is only 30 mV.

It can be seen that, this solution can respond well to the change of the input voltage, and the peak-to-peak value Vpp of the change of the output voltage is reduced from 130 mV to 30 mV.

In order to adapt to the change of load, the current determination module of the embodiment of the present disclosure may further include the second determination unit. The first adjustment current determined by the first determination unit and the second adjustment current determined by the second determination unit may act on the control module together, so that the control module can not only quickly respond to change of the input voltage, but also adapt to different load conditions.

Figure 6:
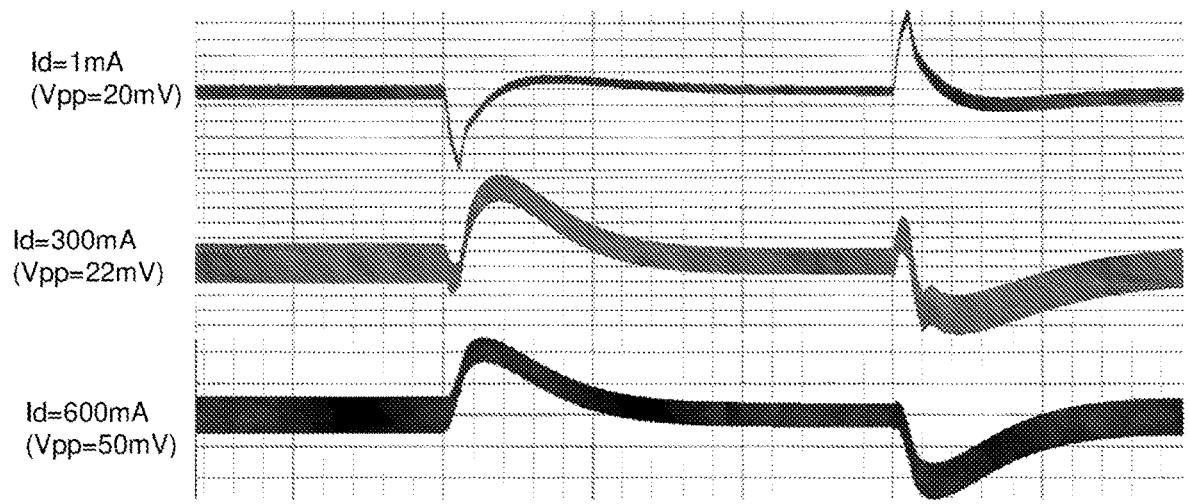
FIG. 6 shows a schematic diagram of voltage change in a voltage adjustment apparatus without using a second determination unit.

Please refer to FIG. 6, which shows a schematic diagram of voltage change in the voltage adjustment apparatus without using the second determination unit.

Figure 7:
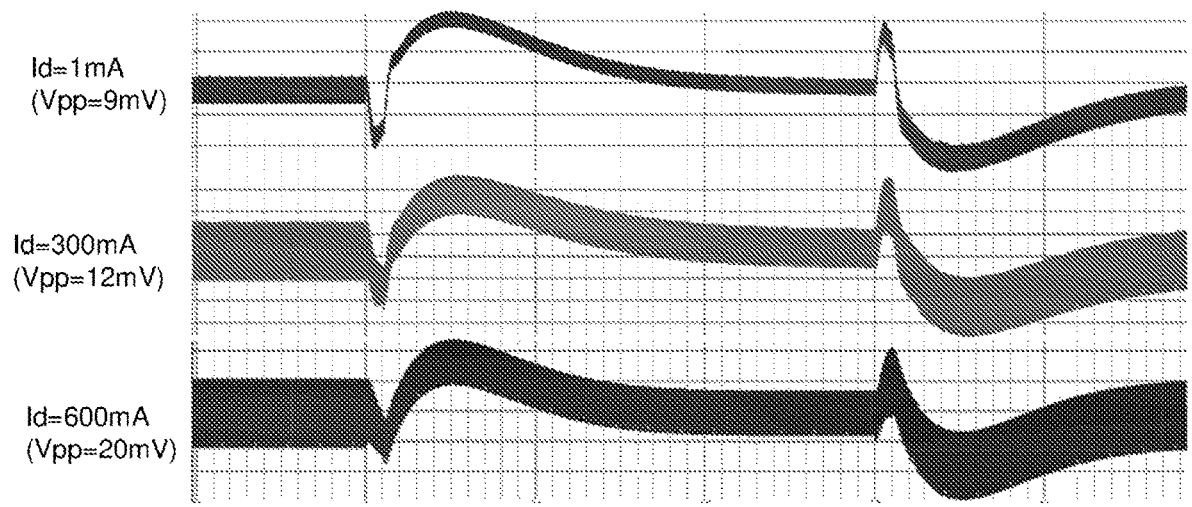
FIG. 7 shows a schematic diagram of voltage change in a voltage adjustment apparatus using the second determination unit.

Please refer to FIG. 7, which shows a schematic diagram of voltage change in the voltage adjustment apparatus using the second determination unit.

As shown in FIG. 6, when the first determination unit determines gm1, the load size needs to be set in advance, so a balance point is selected between light and heavy loads, and the compensation is often insufficient or overflowing for too light or too heavy loads. Therefore, when the second determination unit is not used to detect the load current in FIG. 6, the voltage adjustment apparatus cannot adapt to the change of the load. When the load (the load current Id in FIG. 6) changes, the peak-to-peak value of change $\Delta$Vout of the output voltage has a relatively large fluctuation.

As shown in FIG. 7, the first determination unit is configured to respond quickly to change of the input voltage to determine the first adjustment current, and the second determination unit is configured to detect and compensate for the load current, so that the voltage adjustment apparatus can not only achieve fast response to change of the input voltage, but also provide compensation for different loads. Under different loads, the peak-to-peak value Vpp of the fluctuation section of the output voltage Vout is within 20 mV, thereby improving the environmental adaptability of the apparatus, so that the performance of the fastline excitation of the power source in the TDMA test meets the needs of SPEC and meets the TDMA test requirements of AMOLED in various application environments.

It should be understood that the present disclosure does not limit the selection of each element of the control module 30 and the selection of the reference voltage, which can be determined by those skilled in the art as required.

Various embodiments of the present disclosure have been described above, and the above descriptions are exemplary, not exhaustive, and not limited to the disclosed embodiments. Numerous modifications and variations will be apparent to those of ordinary skill in the art without departing from the scope and spirit of the described embodiments. The selection of terms used herein aims to best explain the principles of the various embodiments, the practical application or improvement of the technology in the marketplace, or to enable others of ordinary skill in the art to understand the various embodiments disclosed herein.

The invention claimed is:

1. A voltage adjustment apparatus, comprising:
a voltage input interface, configured to receive an input voltage;
a current determination component, electrically connected to the voltage input interface, and to determine an adjustment current based on the input voltage and a change amount between the input voltage and an input voltage at an adjacent previous moment;
a controller, electrically connected to the current determination component, and configured to output a control signal based on the adjustment current; and
a voltage output interface, electrically connected to the voltage input interface, the current determination component, and the controller, wherein the voltage output interface is configured to receive the control signal from the controller and output a target voltage based on the control signal and the input voltage,
wherein the adjustment current comprises a second adjustment current, the current determination component comprises a second determination subcomponent configured to determine the second adjustment current, and the second determination subcomponent comprises a current detector, a multiplier, and a current determination subcomponent,
wherein the current detector is electrically connected to the voltage output interface, and configured to detect a load current and obtain a detection voltage based on the load current,
wherein the multiplier is electrically connected to the current detector and the voltage input interface, and configured to multiply the input voltage and the detection voltage to obtain an intermediate voltage, and
wherein the current determination subcomponent is electrically connected to the multiplier, and configured to determine the second adjustment current based on the intermediate voltage.

2. The apparatus of claim 1, wherein the adjustment current comprises a first adjustment current, and the current determination component comprises a first determination subcomponent configured to determine the first adjustment current, the first determination subcomponent comprises a first operational amplifier, a first transistor, a second transistor, a third transistor, a fourth transistor, a fifth transistor, and a first resistor, wherein:
a positive input terminal of the first operational amplifier is configured to receive the input voltage, a negative input terminal of the first operational amplifier is electrically connected to a source of the first transistor and a first terminal of the first resistor, an output terminal of the first operational amplifier is electrically connected to a gate of the first transistor, and a second terminal of the first resistor is grounded,
a drain of the first transistor is electrically connected to a drain of the second transistor, a gate of the second transistor, and a gate of the third transistor,
a source of the second transistor and a source of the third transistor are configured to receive a power supply voltage,
a drain of the third transistor is electrically connected to a drain of the fourth transistor, a gate of the fourth transistor, and a gate of the fifth transistor,
a source of the fourth transistor and a source of the fifth transistor are grounded, and
a drain of the fifth transistor is configured to output the first adjustment current.

3. The apparatus of claim 1, wherein the current detector comprises a sixth transistor, a seventh transistor, a second operational amplifier, a second resistor, and a first capacitor, wherein:
a gate of the sixth transistor is configured to receive the control signal, a drain of the sixth transistor is electrically connected to the voltage input interface, and a source of the sixth transistor is electrically connected to a positive input terminal of the second operational amplifier and a drain of the seventh transistor,
a negative input terminal of the second operational amplifier is electrically connected to the voltage output interface, an output terminal of the second operational amplifier is electrically connected to a gate of the seventh transistor, and a source of the seventh transistor is electrically connected to a first terminal of the second resistor and a first terminal of the first capacitor,
a second terminal of the second resistor and a second terminal of the first capacitor are grounded, and
the first terminal of the second resistor is configured to output a detection voltage.

4. The apparatus of claim 3, wherein the voltage output interface comprises an eighth transistor, a ninth transistor, a tenth transistor, an eleventh transistor, a third operational amplifier, a third resistor, a fourth resistor, and a second capacitor, wherein:
a gate of the eighth transistor is electrically connected to the gate of the sixth transistor, a gate of the tenth transistor, and the controller, and configured to receive the control signal,
a drain of the eighth transistor is electrically connected to a drain of the ninth transistor, the drain of the sixth transistor, a drain of the tenth transistor, and the voltage input interface,
a source of the eighth transistor is electrically connected to a negative input terminal of the third operational amplifier, the negative input terminal of the second operational amplifier, a first terminal of the third resistor, and a first terminal of the second capacitor, a second terminal of the third resistor is electrically connected to the controller and a first terminal of the fourth resistor, a second terminal of the fourth resistor is grounded, and a second terminal of the second capacitor is grounded, a gate of the ninth transistor is electrically connected to the controller and configured to receive the control signal, and a source of the ninth transistor is grounded, a positive input terminal of the third operational amplifier is electrically connected to a source of the tenth transistor and a drain of the eleventh transistor, and an output terminal of the third operational amplifier is electrically connected a gate of the eleventh transistor, a source of the eleventh transistor is electrically connected to the current determination component and the controller, and the first terminal of the third resistor is configured to output the target voltage.

5. The apparatus of claim 4, wherein the voltage input interface comprises an input capacitor and an input inductor, wherein:

a first terminal of the input capacitor is electrically connected to a first terminal of the input inductor and configured to receive the input voltage, and a second terminal of the input capacitor is grounded, and a second terminal of the input inductor is electrically connected to the drain of the ninth transistor, the drain of the eighth transistor, the drain of the sixth transistor, and the drain of the tenth transistor.

6. A chip comprising a voltage adjustment apparatus, wherein the voltage adjustment apparatus comprises:

a voltage input interface, configured to receive an input voltage;

a current determination component, electrically connected to the voltage input interface, and configured to determine an adjustment current based on the input voltage and a change amount between the input voltage and an input voltage at an adjacent previous moment;

a controller, electrically connected to the current determination component, and configured to output a control signal based on the adjustment current; and a voltage output interface, electrically connected to the voltage input interface, the current determination component, and the controller, wherein the voltage output interface is configured to receive the control signal from the controller and output a target voltage based on the control signal and the input voltage, wherein the adjustment current comprises a second adjustment current, the current determination component comprises a second determination subcomponent configured to determine the second adjustment current, and the second determination subcomponent comprises a current detector, a multiplier, and a current determination subcomponent, wherein the current detector is electrically connected to the voltage output interface, and configured to detect a load current and obtain a detection voltage based on the load current, wherein the multiplier is electrically connected to the current detector and the voltage input interface, and configured to multiply the input voltage and the detection voltage to obtain an intermediate voltage, and wherein the current determination subcomponent is electrically connected to the multiplier, and configured to determine the second adjustment current based on the intermediate voltage.

7. The chip of claim 6, wherein the adjustment current comprises a first adjustment current, and the current determination component comprises a first determination subcomponent configured to determine the first adjustment current, the first determination subcomponent comprises a first operational amplifier, a first transistor, a second transistor, a third transistor, a fourth transistor, a fifth transistor, and a first resistor, wherein:

a positive input terminal of the first operational amplifier is configured to receive the input voltage, a negative input terminal of the first operational amplifier is electrically connected to a source of the first transistor and a first terminal of the first resistor, an output terminal of the first operational amplifier is electrically connected to a gate of the first transistor, and a second terminal of the first resistor is grounded, a drain of the first transistor is electrically connected to a drain of the second transistor, a gate of the second transistor, and a gate of the third transistor, a source of the second transistor and a source of the third transistor are configured to receive a power supply voltage, a drain of the third transistor is electrically connected to a drain of the fourth transistor, a gate of the fourth transistor, and a gate of the fifth transistor, a source of the fourth transistor and a source of the fifth transistor are grounded, and a drain of the fifth transistor is configured to output the first adjustment current.

8. The chip of claim 6, wherein the current detector comprises a sixth transistor, a seventh transistor, a second operational amplifier, a second resistor, and a first capacitor, wherein:

a gate of the sixth transistor is configured to receive the control signal, a drain of the sixth transistor is electrically connected to the voltage input interface, and a source of the sixth transistor is electrically connected to a positive input terminal of the second operational amplifier and a drain of the seventh transistor, a negative input terminal of the second operational amplifier is electrically connected to the voltage output interface, an output terminal of the second operational amplifier is electrically connected to a gate of the seventh transistor, and a source of the seventh transistor is electrically connected to a first terminal of the second resistor and a first terminal of the first capacitor, a second terminal of the second resistor and a second terminal of the first capacitor are grounded, and the first terminal of the second resistor is configured to output the detection voltage.

9. A power source comprising a chip, wherein the chip comprises a voltage adjustment apparatus, the voltage adjustment apparatus comprises:

a voltage input interface, configured to receive an input voltage;

a current determination component, electrically connected to the voltage input interface, and configured to determine an adjustment current based on the input voltage and a change amount between the input voltage and an input voltage at an adjacent previous moment of the input voltage;

a controller, electrically connected to the current determination component, and configured to output a control signal based on the adjustment current; and a voltage output interface, electrically connected to the voltage input interface, the current determination component, and the controller, wherein the voltage output interface is configured to receive the control signal from the controller and output a target voltage based on the control signal and the input voltage, wherein the adjustment current comprises a second adjustment current, the current determination component comprises a second determination subcomponent configured to determine the second adjustment current, and the second determination subcomponent comprises a current detector, a multiplier, and a current determination subcomponent, wherein the current detector is electrically connected to the voltage output interface, and configured to detect a load current and obtain a detection voltage based on the load current, wherein the multiplier is electrically connected to the current detector and the voltage input interface, and configured to multiply the input voltage and the detection voltage to obtain an intermediate voltage, and wherein the current determination subcomponent is electrically connected to the multiplier, and configured to determine the second adjustment current based on the intermediate voltage.

10. The power source of claim 9, wherein the adjustment current comprises a first adjustment current, and the current determination component comprises a first determination subcomponent configured to determine the first adjustment current, the first determination subcomponent comprises a first operational amplifier, a first transistor, a second transistor, a third transistor, a fourth transistor, a fifth transistor, and a first resistor, wherein:
  a positive input terminal of the first operational amplifier is configured to receive the input voltage, a negative input terminal of the first operational amplifier is electrically connected to a source of the first transistor and a first terminal of the first resistor, an output terminal of the first operational amplifier is electrically connected to a gate of the first transistor, and a second terminal of the first resistor is grounded,
  a drain of the first transistor is electrically connected to a drain of the second transistor, a gate of the second transistor, and a gate of the third transistor,
  a source of the second transistor and a source of the third transistor are configured to receive a power supply voltage,
  a drain of the third transistor is electrically connected to a drain of the fourth transistor, a gate of the fourth transistor, and a gate of the fifth transistor,
  a source of the fourth transistor and a source of the fifth transistor are grounded, and
  a drain of the fifth transistor is configured to output the first adjustment current.

11. An electronic device comprising a power source, wherein the power source comprises a chip, the chip comprises a voltage adjustment apparatus, wherein the voltage adjustment apparatus comprises:
  a voltage input interface, configured to receive an input voltage;
  a current determination component, electrically connected to the voltage input interface, and configured to determine an adjustment current based on the input voltage and a change amount between the input voltage and an input voltage at an adjacent previous moment;
  a controller, electrically connected to the current determination component, and configured to output a control signal based on the adjustment current; and
  a voltage output interface, electrically connected to the voltage input interface, the current determination component, and the controller, wherein the voltage output interface is configured to receive the control signal from the controller and output a target voltage based on the control signal and the input voltage, wherein the adjustment current comprises a second adjustment current, the current determination component comprises a second determination subcomponent configured to determine the second adjustment current, and the second determination subcomponent comprises a current detector, a multiplier, and a current determination subcomponent, wherein the current detector is electrically connected to the voltage output interface, and configured to detect a load current and obtain a detection voltage based on the load current, wherein the multiplier is electrically connected to the current detector and the voltage input interface, and configured to multiply the input voltage and the detection voltage to obtain an intermediate voltage, and wherein the current determination subcomponent is electrically connected to the multiplier, and configured to determine the second adjustment current based on the intermediate voltage.

12. The electronic device of claim 11, wherein the electronic device includes a display, a smartphone, or a portable device.

13. The electronic device of claim 11, wherein the adjustment current comprises a first adjustment current, and the current determination component comprises a first determination subcomponent configured to determine the first adjustment current, the first determination subcomponent comprises a first operational amplifier, a first transistor, a second transistor, a third transistor, a fourth transistor, a fifth transistor, and a first resistor, wherein:
  a positive input terminal of the first operational amplifier is configured to receive the input voltage, a negative input terminal of the first operational amplifier is electrically connected to a source of the first transistor and a first terminal of the first resistor, an output terminal of the first operational amplifier is electrically connected to a gate of the first transistor, and a second terminal of the first resistor is grounded,
  a drain of the first transistor is electrically connected to a drain of the second transistor, a gate of the second transistor, and a gate of the third transistor,
  a source of the second transistor and a source of the third transistor are configured to receive a power supply voltage,
  a drain of the third transistor is electrically connected to a drain of the fourth transistor, a gate of the fourth transistor, and a gate of the fifth transistor,
  a source of the fourth transistor and a source of the fifth transistor are grounded, and
  a drain of the fifth transistor is configured to output the first adjustment current.

14. The electronic device of claim 11, wherein the current detector comprises a sixth transistor, a seventh transistor, a second operational amplifier, a second resistor, and a first capacitor, wherein:
  a gate of the sixth transistor is configured to receive the control signal, a drain of the sixth transistor is electrically connected to the voltage input interface, and a source of the sixth transistor is electrically connected to a positive input terminal of the second operational amplifier and a drain of the seventh transistor, a negative input terminal of the second operational amplifier is electrically connected to the voltage output interface, an output terminal of the second operational amplifier is electrically connected to a gate of the seventh transistor, and a source of the seventh transistor is electrically connected to a first terminal of the second resistor and a first terminal of the first capacitor, a second terminal of the second resistor and a second terminal of the first capacitor are grounded, and the first terminal of the second resistor is configured to output the detection voltage.

15. The electronic device of claim 14, wherein the voltage output interface comprises an eighth transistor, a ninth transistor, a tenth transistor, an eleventh transistor, a third operational amplifier, a third resistor, a fourth resistor, and a second capacitor, wherein:

a gate of the eighth transistor is electrically connected to the gate of the sixth transistor, a gate of the tenth transistor, and the controller, and configured to receive the control signal, a drain of the eighth transistor is electrically connected to a drain of the ninth transistor, the drain of the sixth transistor, a drain of the tenth transistor, and the voltage input interface, a source of the eighth transistor is electrically connected to a negative input terminal of the third operational amplifier, the negative input terminal of the second operational amplifier, a first terminal of the third resistor, and a first terminal of the second capacitor, a second terminal of the third resistor is electrically connected to the controller and a first terminal of the fourth resistor, a second terminal of the fourth resistor is grounded, and a second terminal of the second capacitor is grounded, a gate of the ninth transistor is electrically connected to the controller and configured to receive the control signal, and a source of the ninth transistor is grounded, a positive input terminal of the third operational amplifier is electrically connected to a source of the tenth transistor and a drain of the eleventh transistor, and an output terminal of the third operational amplifier is electrically connected a gate of the eleventh transistor, a source of the eleventh transistor is electrically connected to the current determination component and the controller, and the first terminal of the third resistor is configured to output the target voltage.

16. The electronic device of claim 15, wherein the voltage input interface comprises an input capacitor and an input inductor, wherein:

a first terminal of the input capacitor is electrically connected to a first terminal of the input inductor and configured to receive the input voltage, and a second terminal of the input capacitor is grounded, and a second terminal of the input inductor is electrically connected to the drain of the ninth transistor, the drain of the eighth transistor, the drain of the sixth transistor, and the drain of the tenth transistor.

* * * * *